April 13, 1954

C. A. MILER 2,674,957

AMUSEMENT DEVICE RUNNING ON TRACKS

Filed Oct. 7, 1949

INVENTOR.
CARL A. MILER

Patented Apr. 13, 1954

2,674,957

UNITED STATES PATENT OFFICE 2,674,957

AMUSEMENT DEVICE RUNNING ON TRACKS

Carl Arthur Miler, Portland, Oreg.

Application October 7, 1949, Serial No. 120,162

10 Claims. (Cl. 104—64)

This invention relates to amusement devices running on tracks. Ordinarily amusement devices of this type have cars with wheeled axles rigidly attached thereon, and are run on tracks having large curves and gradually inclining banks, the friction between the wheels and the track being negligible. But if run on a track having sharp curves, the friction between the wheels and track becomes too excessive for practical operation.

With this in mind, it is the object of my invention to provide an amusement device with wheeled trucks capable of running with a minimum amount of friction and wear on tracks having sharp curves. Also as the top surface of the rails of a track are not always on a parallel plane with each other due to sudden banks, it is necessary to provide a flexibility to said trucks to allow all wheels to bear on said track.

The defects of the prior art are remedied and the above mentioned objects are obtained by means of wheeled flexible trucks capable of running on rails and supporting passenger carrying means.

A device such as that described above is more clearly shown in the accompanying drawing in which like characters of reference are applied to like parts.

Figure 1:
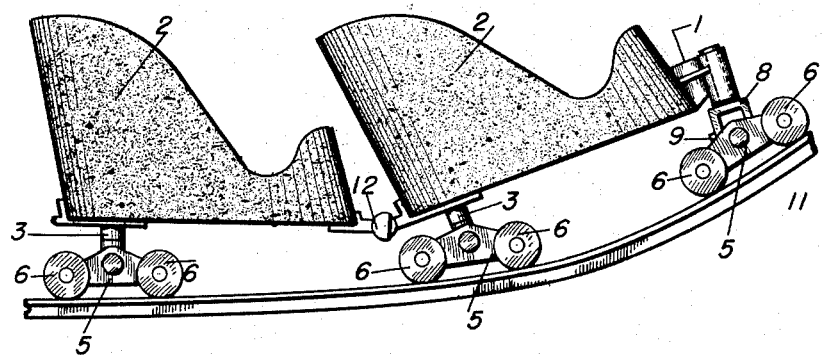
Figure 1 is a side elevation of two cars on a track.
Figure 2:
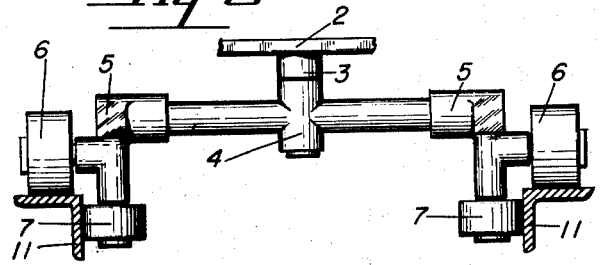
Figure 2 is a view of a truck and a cross section of track rails.
Figure 3:
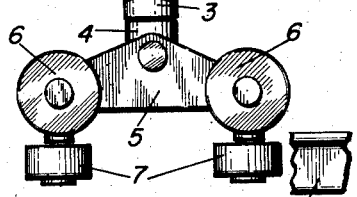
Figure 3 is a side elevation of a truck.
Figure 4:
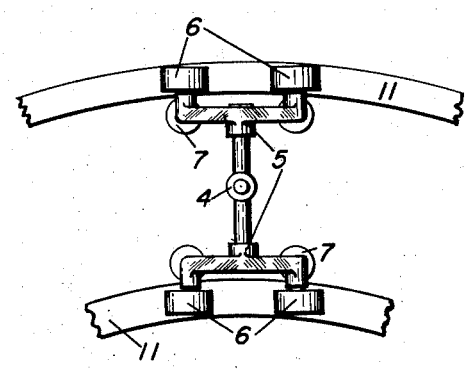
Figure 4 is a top view of a truck.
Figure 5:
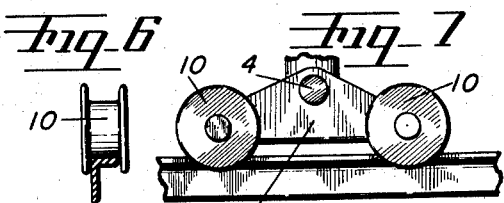
Figure 5 is a sectional view, showing method of doubly pivoting a truck to a car.
Figure 6:
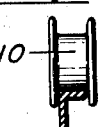
Figure 6 is an end view of a modified wheel.
Figure 7:
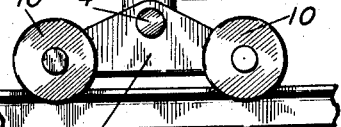
Figure 7 is a side elevation of a truck with modified wheels.

In detail the device comprises a plurality of trucks, each truck consisting of horizontal axle 4, having at its center a vertical pivot shaft 3, which connects with the under side of a passenger carrying means shown as car 2. Beams 5, pivotly attached to each end of axle 4 and each beam overlying one of the rails 11, of a track and supported on the rails by spaced wheels 6, which can all bear on the rails of said track regardless of the unevenness of said rails, and spaced wheels 7 attached to beams 5, and bearing against the sides of rails 11, taking the side thrust of axle 4, and also holding said axle transverse to the rails 11.

Cars 2 are connected in tandem using ball joint connections 12 to allow each car to twist and turn without straining the preceding car.

Each car is supported on axle 4 by pivot shaft 3. The front car is also supported by an additional truck having a rotatable pivot shaft 9 fixed between the ends of axle 4 in a horizontal position and parallel with track 11 pivoted to the yoked end of pivot shaft 8 which is in an upright position and pivotly connected to car 2 by bracket 1, thus eliminating the necessity of the car twisting as the plane of the track changes due to banks at curves etc.

It will be noted that many variations and modifications in wheels can be used, such as wheels 10, which can be substituted for wheels 6 and eliminating wheels 7 to take the combined radial and thrust loads, without departing from the scope of this invention.

I claim:

1. The combination in a wheeled truck of an amusement device of the type described, a horizontal axle, having at a point between its ends a rotatable vertical pivot shaft supporting a passenger carrying means, a beam, pivotably attached at a point between its ends, to each end of said axle in a transverse position in relation to the longitudinal axis of said axle and pivotable about the longitudinal axis of said axle, a rotatable wheel supporting each end of each beam and capable of bearing on the top of an underlying track rail, the axis of said wheel parallel to the axis of said axle, an additional wheel having an axis in an upright position rotatably attached to each end of each beam and capable of bearing on the side of a track rail underlying that respective beam to which said wheel is attached and means for pivotly supporting the front of said passenger carrying means to the rear of another passenger carrying means.

2. In a wheeled truck of an amusement device of the type described, the combination of a horizontal axle having at a point, between its ends, a horizontal pivot shaft rotatably attached in a transverse position in relation to said axle, a yoked upright pivot shaft rotatably attached to a passenger carrying means and fixed to said horizontal pivot shaft, a beam, rotatably attached at a point between its ends, to each end of said axle and pivotable about on the longitudinal axis of said axle, each end of each beam having a wheel means capable of taking a thrust and radial load on a track rail and means for pivotly supporting the front of said passenger carrying means to the rear of another passenger carrying means.

3. In an amusement device of the type described, a truck comprised of a horizontal axle having at its center a rotatable vertical pivot shaft connected to the under side of a car, said axle pivotly supported about its longitudinal axis at each end by a beam, each beam overlying a rail and supported at each end by a wheel, having an axis parallel to the longitudinal axis of said axle, said wheel bearing on the top of said rail, a wheel with a vertical axis, attached to each end of each beam and bearing against the side of the rail that underlies that respective beam and means for pivotly supporting the front of said passenger carrying means to the rear of another passenger carrying means.

4. The combination in an amusement device of the type described, a truck comprised of a horizontal axle having at its center a rotatable vertical pivot shaft connected to the under side of a car, said axle pivotly supported about its longitudinal axis at each end by a beam, each beam overlying a rail and supported at each end by a wheel, having an axis parallel to the longitudinal axis of said axle, said wheel bearing on said rail, a plurality of cars flexibly connected in tandem each of said cars supported at one end on a vertical pivot shaft attached to said truck, rollably mounted on a track, the other end of each car supported by the preceding car; the first car supported by two trucks, one of said trucks having a horizontal pivot shaft parallel with the rails of said track, attached to a yoke having an upright pivot shaft supporting said car.

5. The combination in an amusement device of the type described, a truck comprised of a horizontal axle having at its center a rotatable vertical pivot shaft connected to the under side of a car, said axle pivotly supported about its longitudinal axis at each end by a beam, each beam overlying a rail and supported at each end by a wheel, having an axis parallel to the longitudinal axis of said axle, said wheel bearing on the top of said rail, a wheel with an upright axis, attached to each end of each beam and bearing against the side of the rail that underlies that respective beam, a plurality of cars flexibly connected in tandem, each of said cars supported pivotly at one end on a truck rollably mounted on a track the other end of each car supported by the preceding car; one car supported by two trucks, one of said trucks having a horizontal pivot shaft parallel with the rails of said track attached to a yoke having a vertical pivot shaft supporting said car.

6. The combination in an amusement device of the type described of a passenger carrying means supported at the rear end by a truck, said truck comprised of a horizontal axle having fixed at a point between its ends a rotatable upright pivot shaft attached to the underside of said passenger carrying means, a beam rotatably attached at a point between its ends to each end of said axle in a transverse position in relation to the longitudinal axis of said axle and rotatable about the longitudinal axis of said axle, each end of each beam having a wheel means capable of taking a thrust load and a radial load on an underlying track rail; the front end of said passenger carrying means supported by a truck comprised of a horizontal axle having fixed at a point between its ends a horizontal and rotatable pivot shaft in a transverse position to the longitudinal axis of said axle, a yoke fixed to said horizontal pivot shaft and having an upright pivot shaft rotatably attached to the front of said passenger carrying means, a beam rotatably attached at a point between its ends to each end of said axle in a transverse position in relation to the longitudinal axis of said axle and rotatable about the axis of said axle, each end of each beam having a wheel means capable of taking a thrust load and a radial load on an underlying track rail.

7. The combination in an amusement device of the type described of a plurality of passenger carrying means, the back of each of said passenger carrying means having pivotable means for supporting the front of another such means, one of said passenger carrying means being supported on the front by a truck comprised of a horizontal axle having fixed at a point between its ends a horizontal and rotatable pivot shaft in a transverse position to the longitudinal axis of said axle, a yoke fixed to said horizontal pivot shaft and having an upright pivot shaft rotatably attached to the front of said passenger carrying means, a beam rotatably attached at a point between its ends to each end of said axle in a transverse position in relation to the longitudinal axis of said axle, each end of each beam having a wheel means capable of taking a thrust load and a radial load on an underlying track rail, each of said passenger carrying means being supported at the back by a truck comprised of a horizontal axle having fixed at a point between its ends a rotatable upright pivot shaft attached to the underside of said passenger carrying means, a beam rotatably attached at a point between its ends to each end of said axle in a transverse position in relation to the longitudinal axis of said axle and rotatable about the longitudinal axis of said axle, each end of each beam having a wheel means capable of taking a thrust load and a radial load on an underlying track rail.

8. The combination in an amusement device of the type described of a plurality of passenger carrying means, the front of each passenger carrying means pivotly attached to and supported by the back of another passenger carrying means, the back of each of said passenger carrying means supported by a truck, said truck comprised of a horizontal axle having at its center a rotatable vertical pivot shaft connected to the under side of a passenger carrying means, said axle pivotly supported about its longitudinal axis at each end by a beam, each beam overlying a rail and supported at each end by a wheel having an axis parallel to the longitudinal axis of said axle, said wheel bearing on the top of said rail, a wheel, with an upright axis, attached to each end of each beam and bearing against the side of the rail that underlies that respective beam.

9. The combination in an amusement device of the type described of a passenger carrying means supported at the rear end by a truck, said truck comprised of a horizontal axle having fixed at a point between its ends a rotatable, vertical pivot shaft connected to the under side of a passenger carrying means, said axle pivotly supported about its longitudinal axis at each end by a beam, each beam overlying a rail and supported at each end by a wheel having an axis parallel to the longitudinal axis of said axle, said wheel bearing on the top of said rail, a second wheel, with an upright axis, attached to each end of each beam and bearing against the side of the rail that underlies that respective beam; the front end of said passenger carrying means supported by a truck, said truck comprised of a horizontal axle having fixed at a point between its ends a horizontal and rotatable pivot shaft in a transverse position to the longitudinal axis of said axle, a yoke fixed to said horizontal pivot shaft and having an upright pivot shaft rotatably attached to the front of said passenger carrying means, a beam supporting and rotatably attached at a point between its ends to each end of said axle in a transverse position in relation to the longitudinal axis of said axle and rotatable about the axis of said axle, each beam overlying a rail and supported at each end by a wheel having an axis parallel to the longitudinal axis of said axle, said wheel bearing on the top of said rail, a second wheel, with an upright axis, attached to each end of each beam and bearing against the side of the rail that underlies that respective beam.

10. The combination in an amusement device of the type described of a plurality of passenger carrying means, the back of each having pivotable means for supporting the front of another, one of said passenger carrying means being supported on the front by a truck comprised of a horizontal axle having fixed at a point between its ends a horizontal and rotatable pivot shaft in a transverse position to the longitudinal axis of said axle, a yoke fixed to said horizontal pivot shaft and having an upright pivot shaft rotatably attached to the front of said passenger carrying means, a beam rotatably attached at a point between its ends to each end of said axle in a transverse position in relation to the longitudinal axis of said axle, each beam overlying a rail and supported at each end by a wheel having an axis parallel to the longitudinal axis of said axle, said wheel bearing on the top of said rail, a second wheel, with an upright axis, attached to each end of each beam and bearing against the side of the rail that underlies that respective beam, each of said passenger carrying means being supported at the back by a truck comprised of a horizontal axle having fixed at a point between its ends a rotatable upright pivot shaft attached to the underside of said passenger carrying means, a beam rotatably attached at a point between its ends to each end of said axle in a transverse position in relation to the longitudinal axis of said axle and rotatable about the longitudinal axis of said axle, each beam overlying a rail and supported at each end by a wheel having an axis parallel to the longitudinal axis of said axle, said wheel bearing on the top of said rail, a second wheel, with an upright axis, attached to each end of each beam and bearing against the side of the rail that underlies that respective beam.

References Cited in the file of this patent

UNITED STATES PATENTS

| Number | Name | Date |
| --- | --- | --- |
| 1,593,213 | Hodges | July 20, 1926 |
| 1,755,030 | Schmeck | Apr. 15, 1930 |
| 2,049,401 | Wallace | July 28, 1936 |
| 2,462,666 | Omar | Feb. 22, 1949 |
| 2,595,992 | Tapp et al. | May 6, 1952 |